United States Patent
Kraus et al.

(10) Patent No.: US 8,299,192 B2
(45) Date of Patent: Oct. 30, 2012

(54) STATISTIC COMB POLYMERS, METHOD FOR PRODUCING THE SAME AND THEIR USE

(75) Inventors: Alexander Kraus, Evenhausen (DE); Gerhard Albrecht, Tacherting (DE); Christian Hübsch, Gmund (DE); Harald Grassl, Schönau (DE); Angelika Hartl, Tacherting (DE)

(73) Assignee: Construction Research & Technology GmbH, Trostberg (DE)

( * ) Notice: Subject to any disclaimer, the term of this patent is extended or adjusted under 35 U.S.C. 154(b) by 1130 days.

(21) Appl. No.: 10/567,260

(22) PCT Filed: Aug. 17, 2004

(86) PCT No.: PCT/EP2004/009230
§ 371 (c)(1),
(2), (4) Date: Feb. 6, 2006

(87) PCT Pub. No.: WO2005/019288
PCT Pub. Date: Mar. 3, 2005

(65) Prior Publication Data
US 2007/0043190 A1   Feb. 22, 2007

(30) Foreign Application Priority Data

Aug. 19, 2003   (DE) .................................. 103 37 975

(51) Int. Cl.
*C08F 16/16*   (2006.01)
(52) U.S. Cl. ..................... 526/333; 526/328; 526/317.1; 526/307.2; 526/287; 526/332; 526/319
(58) Field of Classification Search .................. 526/328, 526/317.1, 307.2, 287, 292.3, 332, 333, 319
See application file for complete search history.

(56) References Cited

U.S. PATENT DOCUMENTS

| | | | | |
|---|---|---|---|---|
| 5,684,101 A | * | 11/1997 | Muir et al. | 526/172 |
| 5,707,445 A | * | 1/1998 | Yamato et al. | 106/802 |
| 6,117,921 A | * | 9/2000 | Ma et al. | 523/161 |
| 6,296,698 B1 | * | 10/2001 | Naramoto et al. | 106/808 |
| 6,756,471 B1 | * | 6/2004 | Kroner et al. | 528/271 |
| 2001/0012864 A1 | * | 8/2001 | Satoh et al. | 524/5 |

FOREIGN PATENT DOCUMENTS

| | | |
|---|---|---|
| DE | 19513126 A1 | 10/1996 |
| DE | 19905488 A1 | 8/2000 |
| EP | 0 826 751 A2 | 3/1998 |
| EP | 1 110 981 A2 | 6/2001 |
| EP | 1 184 353 A1 * | 3/2002 |
| EP | 1184353 A1 | 3/2002 |
| JP | 2001002734 * | 1/2001 |
| JP | 2001002734 A | 1/2001 |
| WO | 95/04767 A1 | 2/1995 |
| WO | 00/39211 A2 | 7/2000 |
| WO | WO 00/39211 | 7/2000 |
| WO | WO 01/40338 A1 | 6/2001 |
| WO | 01/48281 A1 | 7/2001 |

* cited by examiner

*Primary Examiner* — Ling Choi
*Assistant Examiner* — Chun-Cheng Wang
(74) *Attorney, Agent, or Firm* — Fitch, Even, Tabin & Flannery, LLP (57) ABSTRACT

Statistic comb polymers obtainable by the radical copolymerization of a vinylic poly(alkylenoxide) compound (A) with an ethylenically unsaturated monomer compound (B) according to the catalytic chain transfer method (CCT). The comb polymers are extremely suitable for hydraulic binder suspensions based on cement, lime, gypsum and anhydrite as they have, for the same dosage, an improved water reducing power over conventional flow agents. The corresponding building material mixtures are characterized by a substantially reduced stickiness and plastic viscosity once said comb polymers are added, which dramatically improves the plasticity of very cement-rich building material mixtures, such as concretes. The building material mixtures using the inventive flow agents have a considerably increased slump flow and an increased shear-thinning behavior as compared to conventional concretes without the tendency to segregate.

27 Claims, 1 Drawing Sheet

Fig. 1

STATISTIC COMB POLYMERS, METHOD FOR PRODUCING THE SAME AND THEIR USE

The present invention relates to random comb polymers which have been prepared by free-radical polymerization by the "catalytical chain transfer" process and also to their use as dispersants for aqueous suspensions of solids. They are suitable as additives for hydraulic binders, in particular cement, but also lime, plaster of Paris and anhydrite. The use of these copolymers leads to a significant improvement in the building materials produced therefrom during processing and curing.

Additives are often added in the form of dispersants to aqueous suspensions of pulverulent inorganic or organic substances, e.g. hydraulic binders (cement, lime, plaster of Paris or anhydrite), ground rock, ground silicate, chalk, clays, porcelain slips, talc, pigments, carbon black or polymer powders, in order to improve their processability, e.g. kneadability, flowability, sprayability, paintability or pumpability. These additives are able to break up agglomerates by adsorption onto the surfaces of the particles and to disperse the particles formed. This leads, particularly in the case of highly concentrated dispersions, to a significant improvement in the processability.

In the production of building material mixtures containing hydraulic binders such as cement, lime, plaster of Paris or anhydrite, this effect can be utilized particularly advantageously, since otherwise significantly more water would be required to achieve a processable consistency than would be necessary for the subsequent hydration or curing process. The water which gradually evaporates after curing leaves voids which significantly impair the mechanical strength and stability of the building components.

To reduce the proportion of water which is excess to hydration requirements and/or to optimize the processability at a given water/binder ratio, additives which are generally referred to as water reduction agents or fluidizers and also as superplasticizers are used.

The still most frequently used fluidizers are polycondensation products based on naphthalenesulfonic or alkylnaphthalenesulfonic acids (cf. EP-A 214 412) and also melamine-formaldehyde resins containing sulfonic acid groups (cf. DE-C 16 71 017).

However, these fluidizers have the disadvantage that their good fluidizing action, in particular in concrete construction, is retained for only a relatively short time even at relatively high added amounts. This decrease in the flowability of concrete mixtures is also referred to as "slump loss". It leads to problems particularly when relatively long periods of time elapse between production of the concrete and its installation, as often result from long transport or conveying distances.

Furthermore, the liberation of toxic formaldehyde, which is present as a result of the production process, can lead to significant occupational hygiene hazards if processing is carried out in the interior of a building (production of prefabricated concrete components or drying of gypsum plasterboard) or in mining or tunnel construction.

To circumvent these disadvantages, formaldehyde-free fluidizers based on maleic monoesters and styrene have been developed (cf. EP-A 306 449). Although these additives enable a high dispersion performance to be achieved over a sufficient period of time (low slump loss), these positive properties are quickly lost on storing the aqueous preparations of these fluidizers. The low storage stability of these fluidizer solutions can be attributed to the ease with which the maleic monoesters hydrolyze.

To circumvent this problem, various hydrolysis-stable fluidizers have been developed. All these fluidizers are copolymers of ethylenically unsaturated carboxylic acids (e.g. acrylic acid, methacrylic acid or maleic acid or their salts) and poly(alkylene oxides) having a polymerizable end group (e.g. methacrylates, allyl ethers or vinyl ethers). The incorporation of these long-chain monomers into a polymer chain leads to polymers having a comb-like structure (cf. U.S. Pat. No. 5,707,445 B1, EP 1 110 981 A2, EP 1 142 847 A2).

These comb polymers have a high storage stability together with a significantly improved effectiveness compared to fluidizers based on lignin, naphthalene or melamine condensate.

According to a widely accepted theory, the effectiveness of the fluidizers is based on two different effects. Firstly, the negatively charged acid groups of the fluidizers adsorb on the cement particle surface which is positively charged due to calcium ions. The resulting electrostatic double layer (zeta potential) leads to electrostatic repulsion between the particles. However, the repulsion forces caused by the zeta potentials have only a short range (cf. H. Uchikawa, Cement and Concrete Research 27 [1] 37-50 (1997)).

However, the physical presence of the adsorbed fluidizer also prevents the surfaces of the cement particles from coming into direct contact with one another. This steric repulsion effect is greatly increased by the nonadsorbed side chains of the abovementioned comb polymers (cf. K. Yoshioka, J. Am. Ceram. Soc. 80 [10] 2667-71 (1997)). It is self-evident that the steric repulsion effect can be influenced both by the length of the side chains and by the number of side chains per main chain. On the other hand, a side chain density or length which is too high can hinder the adsorption on the cement particle surface. To determine the degree of adsorption of a fluidizer on cement particles, the content of organic material is determined (TOC analysis) after addition of the fluidizer to the make-up water. After the cement has been stirred in and the mixture has been left for a short time, the water is pressed out of the cement binder and the collected pore water is analyzed once again by means of TOC analysis. The decrease in the TOC value then corresponds to the proportion of adsorbed fluidizer. It has been able to be shown by means of such measurements that large parts of the fluidizer are not adsorbed. This is not surprising since the side chains are not stretched out in solution but are presumably present in tangled form. As a result, carboxylate groups in the immediate vicinity of the side chain are sterically shielded from the cement particle and cannot contribute to adsorption.

In addition, the preparation of the fluidizers by free-radical copolymerization of a plurality of different monomers leads to relatively nonuniform products in respect of molecular weight and side chain density. It is therefore not surprising that part of these fluidizers is not adsorbed on the cement particle surface but remains dissolved in the pore water. If the main chain is too short or the side chain density is too high, it is possible, for example, for the number of carboxyl groups accessible to the cement particle surface to be insufficient. On the other hand, main chains which are too long and have a low side chain density can bridge cement particles and thus promote flocculation. These nonadsorbed amounts presumably make no contribution to the water reduction capability of the fluidizer.

As mentioned above, the polymeric fluidizers known from the prior art for cement-containing systems are copolymers which have a comb-like structure and are prepared by means of free-radical polymerization. All these products have a high degree of nonuniformity in respect of the number of side chains per polymer molecule and in respect of the molecular weight. However, it is known that there is an optimum molecular weight and an optimum number of side chains per polymer molecule for each application and each type of cement. All constituents of a product which deviate from this optimum therefore reduce the effectiveness of the product or make higher added amounts necessary. Furthermore, it is known that polymers having an excessively high molecular weight can have a coagulating action.

According to the German patent application 102 37 286.1, it has been found that linear polyethylene oxide-polycarboxylic acid block copolymers having low molecular weights in the range from 1000 to 20 000 g/mol surprisingly have a better fluidizing action than commercial products based on comb-like polyether carboxylates.

However, the synthesis of the block polymers described in the patent application DE 102 37 286.1 by means of atom transfer radical polymerization (ATRP) is relatively complicated. Since free (meth)acrylic acid cannot be polymerized directly in a controlled fashion by means of ATRP, a circuitous route via the corresponding tert-butyl ester of (meth) acrylic acid has to be employed. Owing to the fact that these esters and largely insoluble in water, the ATRP has to be carried out either in bulk or in organic solvents. The polymerization is then followed by the acid-catalyzed, selective cleavage of the tert-butyl ester groups, resulting in liberation of isobutylene. Furthermore, the ATRP catalysts have a relatively strong corrosive effect on steel reactors. ATRP is thus not optimal for industrial production.

It is therefore an object of the present invention to provide polymer compounds which have a similarly good effectiveness as the above-described linear block copolymers but are substantially simpler to synthesize.

This object is achieved by the provision of random comb polymers which have been prepared by free-radical copolymerization of a vinylic poly(alkylene oxide) compound (A) with at least one ethylenically unsaturated monomer compound (B) by the "catalytical chain transfer" polymerization method (CCT).

CCT polymerization is described in more detail in the following patents and publications: U.S. Pat. No. 4,526,945 B1, U.S. Pat. No. 4,680,354 B1, EP 196 783 A1, EP 199 436 A1, WO 87/03 605 A1, DE 694 23 653 T2, N. S. Enikolopyan et al., J. Polym. Sci., Polym. Chem. Ed., (1981), 19, 879; D. M. Haddleton et al., Journal of Polymer Science, Part A: Polymer Chemistry (2001), 39(14), 2378-2384.

CCT makes it possible to prepare polymers or oligomers having significantly lower molecular weights than is possible via conventional free-radical polymerization.

While it is very difficult to obtain molecular weights below 6000 g/mol by means of conventional free-radical polymerization, even when using equimolar amounts of thioregulators, based on the monomers, CCT makes it possible to produce polymers having very low molecular weights (less than 50 000 g/mol, in particular less than 4000 g/mol) without difficulties. The amount of CCT catalyst required is a number of orders of magnitude lower than in the case of conventional (thio)regulators. This leads not only to a significant reduction in production costs, but also helps to avoid the odor pollution which is unavoidable when using large amounts of thioregulators.

These novel random comb polymers prepared by means of CCT polymerization surprisingly display a better water reduction capability at the same added amount than conventional fluidizers based on comb polymers. Furthermore, the concrete after addition of these novel fluidizers displays a signficantly reduced stickiness and plastic viscosity, which greatly improves, in particular, the processability of very cement-rich concretes. The company NMB Ltd. has coined the term "rheosmooth" to describe this particular processing property of the concrete. It is also noteworthy that concretes which have been produced using the fluidizers of the invention display a significantly greater spread compared to those produced using conventional polycarboxylate ether fluidizers at the same slump. Thus, at the same water/cement ratio, the concretes display a greater shear-thinning behavior than conventional concretes, but without displaying a tendency to segregate ("bleed").

In addition, the slump loss can be reduced compared to conventional fluidizers by varying the monomer ratios, which was likewise not foreseeable.

The random comb polymers of the invention are obtainable by free-radical copolymerization of a vinylic poly(alkylene oxide) compound (A) with an ethylenically unsaturated monomer compound (B) in the presence of CCT catalysts.

The vinylic poly(alkylene oxide) compound (A) used according to the invention corresponds to the general formula (I)

$$R^1-O-(C_mH_{2m}O)_{\overline{n}-1}-C_mH_{2m}-Z \qquad (I)$$

where $R^1$ has the following meaning: a hydrogen atom, an aliphatic hydrocarbon radical having from 1 to 20 carbon atoms, a cycloaliphatic radical having from 5 to 12 carbon atoms or an aryl radical having from 6 to 14 carbon atoms, which may optionally be substituted. Suitable substituents are, for example, hydroxyl, carboxyl or sulfonic acid groups. The indices have the following meanings: m=2 to 4 and n=1 to 250, with m preferably being 2 or 3 and n preferably being 5 to 250 and more preferably from 20 to 135.

Preferred cycloalkyl radicals are cyclopentyl or cyclohexyl radicals, and preferred aryl radicals are phenyl or naphthyl radicals which, in particular, may be substituted by hydroxyl, carboxyl or sulfonic acid groups.

For the purposes of the present invention, the building block Z has the following meanings: Z is derived from vinylically unsaturated compounds of the general formula Here, m' can be from 1 to 4 and n' can be 0, 1 or 2, with preference being given to m'=1 and n'=0 or 1. Y can be O or $NR^2$, and $R^2$ can be H, an alkyl radical having from 1 to 12 carbon atoms or an aryl radical having from 6 to 14 carbon atoms or $-C_mH_{2m}-(O-C_mH_{2m})_{\overline{n}-1}R^1$, where $R^1$, m and n are as defined above. Particular preference is given to $R^2$=H, $CH_3$ or $C_2H_5$.

Comonomers used are (free radically) polymerizable ethylenically unsaturated monomer compounds (B) of the general formula (II). For the preparation of dispersants, water-soluble ethylenic unsaturated compounds are particularly suitable.

$R^4$ can be H or a substituted or unsubstituted $C_6$-$C_{14}$-aryl radical. Suitable substituents are, for example, hydroxyl, carboxyl or sulfonic acid groups. $R^3$ and $R^5$ can be H, $CH_3$, COOH or their salts, $COOR^7$, $CONR^7R^7$ or $-C_mH_{2m}-(O-C_mH_{2m})_{\overline{n}-1}OR^1$, where preference is given to using alkali metal (sodium, potassium), alkaline earth metal (calcium) or ammonium salts as carboxylic acid salts and $R^1$, m and n are as defined above.

$R^7$ can be H, $C_1$-$C_{12}$-alkyl, $C_1$-$C_{12}$-hydroxyalkyl, $C_1$-$C_{12}$-alkylphosphate or -phosphonate and salts thereof (alkali metal, alkaline earth metal or ammonium salts) or $C_1$-$C_{12}$-alkylsulfate or -sulfonate and salts thereof (alkali metal, alkaline earth metal or ammonium salts).

$R^3$ and $R^5$ in the formula (I) can together form an —O—CO—O— group, so that the corresponding monomers are derived from maleic anhydride. $R^5$ can also be a substituted or unsubstituted $C_6$-$C_{14}$-aryl radical or $OR^8$, where $R^8$=acetyl. Suitable substituents are, for example, hydroxyl, carboxyl or sulfonic acid groups.

Finally, $R^5$ can also be $PO_3H_2$, $SO_3H$ or CONH—$R^9$ or an alkali metal, alkaline earth metal or ammonium salt thereof. $R^9$ is in this case $C_1$-$C_{12}$-alkylphosphate or -phosphonate or a salt thereof, $C_1$-$C_{12}$-alkylsulfate or -sulfonate or a salt thereof, with the alkali metal, alkaline earth metal and ammonium salts being possible as salts in each case. $R^6$ is H, $CH_3$ or $CH_2$—$COOR^7$, where $R^7$ is as defined above.

To prepare the copolymers of the invention, preference is given to using monomer compounds in which $R^3$ and $R^4$=H or $R^3$ and $R^5$ together form an O—CO—O group, $R^6$=H, $CH_3$ or $CH_2$—$COOR^7$ and $R^5$=$COOR^7$, $PO_3H_2$, $SO_3H$ or CONH—$R^9$—$SO_3H$ or a phenyl radical which may optionally be substituted by hydroxyl, carboxyl or sulfonic acid groups. Preference is given to $R^3$ and $R^4$=H, $R^6$=H, $CH_3$ and $R^5$=$COOR^7$, $PO_3H_2$ or CONH—$R^9$—$SO_3H$ and very particularly preferably $R^3$ and $R^4$=H, $R^5$=$CH_3$, $R^5$=COOH or a salt thereof or $COOR^7$ and $R^7$=$C_1$-$C_6$-hydroxyalkyl.

The comb polymers of the invention can have molar ratios of vinylic poly(alkylene oxide) compound (A) to ethylenically unsaturated monomer compound (B) of from 1:0.01 to 1:100. However, preference is given to ratios of from 1:0.1 to 1:50 and particular preference is given to ratios of from 1:1 to 1:35.

According to the invention, the comb polymers are prepared by free-radical polymerization in the presence of CCT catalysts and suitable initiators at temperatures of from 30 to 150° C.

In a preferred embodiment, the polymerization is carried out in the presence of CCT catalysts as are described in EP 739 359 B1. These catalysts preferably have the following general formula (III), (III)

where R is, in particular, a methyl group.

To carry out the polymerization under CCT conditions, the monomers and solvents, preferably water, are firstly freed of oxygen by methods known to those skilled in the art of polymerization or organic synthesis. This can be achieved, for example, by passing nitrogen, argon or another nonoxidizing gas through the solution. The monomer solution is then admixed with an initiator (in particular an azo initiator or redox system) and the CCT catalyst and is heated. Suitable azo initiators should be soluble in the reaction mixture and have a half-life appropriate to the reaction temperature.

Without making any claim to completeness, the following azo initiators are particularly suitable for polymerizations in an aqueous medium: 2,2'-azobis[2-methylpropionamidine) dihydrochloride (CAS 2997-92-4), 2,2'-azobis[2-(2-imidazolin-2-yl)propane]dihydrochloride (CAS 27776-21-2) or 4,4"azobis(4-cyano-pentanoic acid] (CAS 2638-94-0). The polymerization temperature depends on the thermal half-life of the azo initiator used. The reaction temperatures are usually in the range from 30 to 150° C., preferably from 40 to 100° C. and more preferably from 50 to 80° C.

In a modification of the above-described method, it is also possible to meter in one or more monomer components during the reaction. Furthermore, part of the CCT catalyst can be charged initially and part can be metered in during the course of the polymerization. It is also possible to meter in the total amount of the catalyst during the course of the polymerization, but this usually leads to more nonuniform products.

Although a substantial freedom from oxygen is critical to the success of CCT polymerizations, i.e. for the preparation of polymers having low molecular weights and monomodal molecular weight distributions, it has been found that it is surprisingly possible, nevertheless, to initiate CCT polymerizations by means of redox systems. In this case, it is critical that the reducing component is initially charged and the oxidizing component is slowly metered in during the course of the polymerization. It is possible to use, inter alia, hydrogen peroxide, tert-butyl hydroperoxide, benzoyl peroxide, lauroyl peroxide and persulfates as oxidation component. Suitable reducing agents are metal salts which can be converted into a higher oxidation state, for example iron(II) sulfate, ascorbic acid and hydroxymethanesulfinates and derivatives and salts thereof.

The present invention further provides for the use of the comb polymers of the invention as dispersants for aqueous suspensions of solids, wherein the respective comb polymers are used in an amount of from 0.01 to 5% by weight, based on the respective suspension of solids.

It is possible within the scope of the present invention for the respective suspension of solids to comprise inorganic particles which are selected from the group consisting of ground rock, ground silicate, chalk, clays, porcelain slips, talc, pigments and carbon black.

The comb polymers of the invention are particularly preferably used for hydraulic binder suspensions based on cement, lime, plaster of Paris and anhydrite. The comb polymers of the invention here display a better water reduction capability at the same added amount compared to conventional fluidizers based on comb polymers corresponding to the prior art.

In addition, the corresponding building material mixtures after addition of these comb polymers display considerably reduced stickiness and plastic viscosity, which greatly improves, in particular, the processability of very cement-rich building material mixtures, e.g. concretes. In addition, the building material mixtures using the fluidizers proposed according to the invention display a signficantly higher spread at the same slump compared to mixtures comprising conventional polycarboxylate ether fluidizers. The building material mixtures and in particular concretes thus have a stronger shear-thinning behavior than conventional concretes at the same water/cement ratio, but without tending to segregate ("bleed").

Random comb polymers which are obtainable by free-radical copolymerization of a vinylic poly(alkylene oxide) compound (A) with an ethylenically unsaturated monomer compound (B) by the "catalytical chain transfer (CCT)" method are described. These comb polymers are highly suitable for hydraulic binder suspensions based on cement, lime, plaster of Paris and anhydrite, since they display a better water reduction capability at the same added amount than the conventional fluidizers based on comb polymers based on the prior art. In addition, the corresponding building material mixtures after addition of these comb polymers have a significantly reduced stickiness and plastic viscosity, which, in particular, greatly improves the processability of very cement-rich building material mixtures such as concretes. Furthermore, the building material mixtures using the fluidizers proposed according to the invention display a significantly higher spread at the same slump compared to mixtures comprising conventional polycarboxylate ether fluidizers. The building material mixtures and in particular concretes thus have a stronger shear-thinning behavior at the same water/cement ratio than conventional concretes, but without tending to segregate ("bleed").

The following examples and the accompanying drawing illustrate the invention.

EXAMPLES

A. General Methods for the Synthesis of the Fluidizers According to the Invention by Means of CCT Variant 1

A 500 ml three-necked flask is provided with precision glass stirrer, an inlet for inert gas (nitrogen), gas wash bottle for discharge of inert gas, a metering pump for metered addition of monomer solutions and a heating bath. Furthermore, a stock vessel for the monomer solution is required, and this likewise has to be made oxygen-free by means of inert gas. 20 ml of water and the azo initiator are placed in the flask. The solution is subsequently made oxygen-free by passing the inert gas through it.

The monomers are placed in the stock vessel as a mixture and are, if necessary, diluted with water so that a pumpable solution is obtained. The monomer solution in the stock vessel is likewise made oxygen-free by paaring inert gas through it.

The cobalt complex is then introduced into the reaction vessel, inert gas is once again passed through for 10 minutes and the reaction vessel is finally heated to a temperature at which the azo initiator used has an appropriate half-life (about 45 to 90 min). The monomer mixture is fed in from the stock vessel over the entire reaction time. In the case of the examples described below, the monomer is metered in linearly.

The reaction is complete when no appreciable amounts of monomer can be detected by means of GPC or GC. This is generally the case after from 4 to 8 hours. Variant 1 can be used advantageously when all monomers used have similar polymerization rates. This is the case, for example, when using short-chain polyethylene glycol monomethyl ether methacrylates (MPEG-MA) for the synthesis of the copolymers according to the invention.

Variant 2

A 500 ml three-necked flask is provided with precision glass stirrer, an inlet for inert gas (nitrogen), gas wash bottle for discharge of inert gas, a metering pump for metered addition of monomer solutions and a heating bath. Furthermore, a stock vessel for the monomer solution is required, and this likewise has to made oxygen-free by means of inert gas.

The macromonomer (MPEG-MA) and the azo initiator are placed in the flask and diluted with water so that a readily stirrable solution is formed. The water content is usually 50% by weight. The solution is subsequently made oxygen-free by passing the inert gas through it.

The cobalt complex is then added, and inert gas is passed through for another 10 minutes. The reaction temperatures and times are the same as in variant 1. The comonomer from the stock vessel is fed in over the entire reaction time. In the case of the examples described below, the monomer is metered in linearly.

Examples of the synthesis of copolymers according to the invention are summarized in Table 1. Here, MA is methacrylic acid, IT is itaconic acid, HEMA is hydroxyethyl methacrylate, EGMAP is ethylene glycol monomethacrylate phosphate and V44™ is 2,2'-azobis[2-(2-imidazolin-2-yl)propane]dihydrochloride. The mean molecular weight of the MPEG substituent of the MPEG-MA used is in each case shown in the $4^{th}$ column.

TABLE 1

| Example No. | Variant | MA [mol] | IT [mol] | HEMA [mol] | EGMAP [mol] | MPEG-MA [mol] | V44™ [mg] | Cocat. [mg] | Temp. [° C.] | Reaction time [h] | $M_w$ [g/mol] PD |
|---|---|---|---|---|---|---|---|---|---|---|---|
| A.1 | 1 | 0.27 | x | x | x | 350 0.17 | 600 | 21 | 60 | 6 | 5790 1.5 |
| A.2 | 1 | 0.65 | x | x | x | 350 0.22 | 1200 | 45 | 60 | 6 | 6100 1.52 |
| A.3 | 1 | 0.27 | x | x | x | 475 0.17 | 600 | 22 | 60 | 5 | 6200 1.49 |
| A.4 | 1 | 0.65 | x | x | x | 475 0.22 | 1200 | 44 | 60 | 6 | 5870 1.43 |
| A.5 | 1 | 0.65 | x | x | x | 475 0.07 | 1200 | 43 | 60 | 8 | 6230 1.47 |
| A.6 | 1 | 0.84 | x | x | x | 475 0.028 | 1200 | 64 | 60 | 8 | 6090 1.56 |
| A.7 | 1 | 0.76 | x | 0.08 | x | 475 0.054 | 1200 | 43 | 60 | 3 | 6100 1.49 |

TABLE 1-continued

| Example No. | Variant | MA [mol] | IT [mol] | HEMA [mol] | EGMAP [mol] | MPEG-MA [mol] | V44[™] [mg] | Cocat. [mg] | Temp. [° C.] | Reaction time [h] | $M_w$ [g/mol] PD |
|---|---|---|---|---|---|---|---|---|---|---|---|
| A.8  | 2 | 0.55  | x    | x    | x     | 750 0.11   | 300  | 22 | 60 | 5 | 7950 1.55 |
| A.9  | 2 | 0.8   | x    | x    | x     | 750 0.08   | 600  | 45 | 60 | 4 | 7190 1.54 |
| A.10 | 2 | 0.84  | x    | x    | x     | 750 0.028  | 1200 | 64 | 60 | 6 | 6240 1.57 |
| A.11 | 2 | 0.27  | 0.11 | x    | x     | 750 0.054  | 600  | 22 | 60 | 6 | 7000 1.51 |
| A.12 | 2 | 0.54  | x    | 0.27 | x     | 750 0.054  | 600  | 25 | 60 | 6 | 9100 1.62 |
| A.13 | 2 | 0.64  | x    | 0.21 | x     | 750 0.043  | 600  | 25 | 60 | 6 | 9000 1.58 |
| A.14 | 2 | 0.067 | x    | x    | 0.057 | 750 0.084  | 300  | 53 | 60 | 6 | 10230 1.78 |
| A.15 | 2 | 0.4   | x    | x    | x     | 1100 0.07  | 600  | 25 | 60 | 5 | 7300 1.63 |
| A.16 | 2 | 0.5   | x    | x    | x     | 1100 0.05  | 600  | 21 | 60 | 6 | 7730 1.51 |
| A.17 | 2 | 0.16  | x    | x    | x     | 1100 0.05  | 300  | 11 | 60 | 6 | 12120 1.64 |
| A.18 | 2 | 0.8   | x    | x    | x     | 2000 0.04  | 600  | 22 | 60 | 5 | 9330 1.49 |
| A.19 | 2 | 0.4   | x    | x    | x     | 4500 0.013 | 600  | 22 | 60 | 7 | 12300 1.61 |
| A.20 | 2 | 0.4   | x    | x    | x     | 4500 0.008 | 600  | 25 | 60 | 7 | 10800 1.6 |

Figure 1:
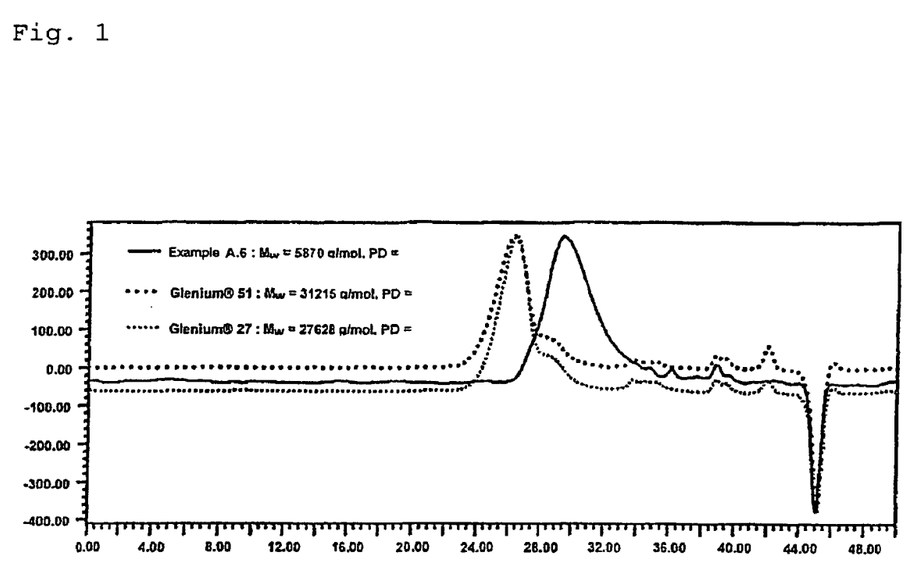
FIG. 1 GPC chromatogram for Example A.6. RI detection Mobile phase: mixture of 80% of 0.05 M aqueous ammonium formate solution and 20% of acetonitrile; column combination (from Showa Denko): Shodex OHpak SB-804 HQ (8 mm×300 mm) and Shodex OHpak 802.5 HQ (8 mm×300 mm) and a Shodex OHpak SB-G (6 mm×50 mm) as precolumn. Column packing: polyhydroxymethyl methacrylate.

FIG. 1 shows the GPO chromatogram of Example A.6. The chromatograms of the remaining polymers according to the invention are very similar to this example. The polydispersities are usually below 1.6 and are therefore significantly lower than the polydispersities which can be achieved by means of conventional free-radical polymerization techniques.

B. Mortar Tests for Determining the Water Reduction Capability and Retention of the Flowability Over a Period of 90 Minutes The tests were carried out in accordance with DIN EN 1015-3.

Table 2: Results of the mortar spread tests using CEM I 42.5 R v.02.03 Karlstadt

TABLE 2

| Rilem mixer; cement: Karlstadt; S/C = 2.2 Standard sand = 70%; silica sand = 30% | | | | spread of mortar: | | | | |
|---|---|---|---|---|---|---|---|---|
| Example | Fluidizer | W/C | Add. [%] | 0 min [cm] | 30 min [cm] | 60 min [cm] | 90 min [cm] | Δ [cm] |
| B.1  | A.1  | 0.46 | 0.2  | 21.6 | 21.5 | 21.5 | 21   | 0.6 |
| B.2  | A.2  | 0.46 | 0.2  | 24.5 | 22.7 | 22.3 | 22.3 | 2.2 |
| B.3  | A.3  | 0.47 | 0.2  | 23   | 22   | 21.4 | 21.3 | 1.7 |
| B.4  | A.4  | 0.4  | 0.25 | 25.2 | 24   | 23   | 22.6 | 2.6 |
| B.5  | A.5  | 0.4  | 0.2  | 25.5 | 21.9 | 21.2 | 20.6 | 4.9 |
| B.6  | A.6  | 0.4  | 0.2  | 23.4 | 21.2 | 20.3 | 20.3 | 3.1 |
| B.7  | A.7  | 0.46 | 0.2  | 25.5 | 23.1 | 22.5 | 21.8 | 3.7 |
| B.8  | A.8  | 0.37 | 0.2  | 24.6 | 20.7 | 20.1 | 19.6 | 5.0 |
| B.9  | A.9  | 0.38 | 0.2  | 24.2 | 22.3 | 21.2 | 20.5 | 3.7 |
| B.10 | A.10 | 0.44 | 0.2  | 24.4 | 21.5 | 20.4 | 20   | 4.4 |
| B.11 | A.11 | 0.37 | 0.2  | 22.7 | 19.4 | 19.4 | 18.9 | 3.8 |
| B.12 | A.12 | 0.42 | 0.2  | 22.7 | 20.9 | 20.9 | 20.7 | 2.0 |
| B.13 | A.13 | 0.44 | 0.2  | 23.8 | 22.5 | 22.4 | 22.5 | 1.3 |
| B.14 | A.14 | 0.44 | 0.2  | 24   | 21.8 | 21.8 | 21.4 | 2.6 |
| B.15 | A.15 | 0.44 | 0.2  | 24.7 | 21.6 | 21.7 | 21.4 | 3.3 |
| B.16 | A.16 | 0.42 | 0.2  | 25.6 | 22.7 | 22.2 | 21.3 | 4.3 |
| B.17 | A.17 | 0.47 | 0.2  | 22.5 | 21.7 | 21.3 | 21.6 | 0.9 |
| B.18 | A.18 | 0.41 | 0.2  | 24   | 20.3 | 20.8 | 18.5 | 5.5 |
| B.19 | A.19 | 0.4  | 0.2  | 23   | 19.3 | 18   | 16.8 | 6.2 |
| B.20 | A.20 | 0.38 | 0.2  | 23.1 | 18.2 | 17.6 | 16.5 | 6.6 |
| B.21 | without additive | 0.48 | 0 | 20.6 | — | — | — | — |
| B.22 | Glenium ® 27 | 0.48 | 0.2 | 23.1 | 23 | 23 | 22.9 | 0.2 |
| B.23 | Glenium ® 51 | 0.4  | 0.2 | 24.7 | 22.8 | 22.1 | 21.8 | 2.90 |

The commercial products Glenium® 51 and Glenium® 27 were employed as reference substances. While in the case of Glenium® 51 (Example B.23) the system was optimized to achieve a maximum water reduction, in the case of Glenium® 27 (Example B.22), the maintenance of processability over a period of 90 minutes was the main objective. Example B.21 reflects the behavior of a mortar without additional fluidizers. At a W/C ratio of 0.48, an initial spread of about 20 cm is achieved. However, the mortar stiffens so quickly that no spread can be determined after only 10 minutes. When Glenium® 27 is added to a mortar having an identical W/C of 0.48, the spread increases only moderately to about 23 cm, but the consistency remains virtually unchanged for a period of 90 minutes.

27. The slump value is a measure of the degree to which the concrete cake collapses after the metal cone is lifted off (height difference between the upper edge of the metal cone and the height of the concrete cake after the metal mold has been taken off). The slump flow corresponds to the base diameter of the concrete cone after the concrete has slumped.

TABLE 3

Gl. 51 = Glenium ® 51, Gl. 27 = Glenium ® 27

| Example | Fluidizer | w/c | Slump in [cm] | | | | | Slump flow in [cm] | | | | | Spread in [cm] | | | | |
|---|---|---|---|---|---|---|---|---|---|---|---|---|---|---|---|---|---|
| | | | 0 | 10 | 40 | 60 | 90 | 0 | 10 | 40 | 60 | 90 | 0 | 10 | 40 | 60 | 90 |
| C.1 | A.1 | 0.6 | 18.5 | 17 | 13 | 14 | 9 | 34 | 28 | 25 | 25 | 21 | 55 | 55 | 52 | 52 | 49 |
| C.2 | A.2 | 0.6 | 20.5 | 20.5 | 19 | 15.5 | 15 | 36 | 36 | 32 | 28 | 27 | 61 | 61 | 57 | 55 | 53 |
| C.3 | A.4 | 0.6 | 19.5 | 20.5 | 19.5 | 20.5 | 18 | 39 | 39 | 37 | 34 | 33 | 63 | 65 | 62 | 59 | 55 |
| C.4 | A.5 | 0.59 | 19 | 19 | 16.5 | 15 | 14 | 34 | 34 | 29 | 27 | 25 | 59 | 58 | 55 | 53 | 51 |
| C.5 | A.7 | 0.60 | 21 | 22 | 19.5 | 19 | 17 | 36 | 38 | 31 | 30 | 28 | 62 | 62 | 59 | 57 | 55 |
| C.6 | A.8 | 0.60 | 19.5 | 19 | 17 | 7 | | 31 | 30 | 26 | 20 | | 62 | 60 | 55 | 54 | |
| C.7 | A.8 | 0.60 | 20.5 | 20 | 19 | 19 | 17 | 36 | 37 | 31 | 33 | 31 | 61 | 61 | 59 | 56 | 54 |
| C.8 | A.9 | 0.55 | 20.5 | 19.5 | 16.5 | 5.5 | | 38 | 34 | 28 | 20 | | 61 | 59 | 53 | 50 | |
| C.9 | A.9 | 0.6 | 20.5 | 20 | 19 | 18 | | 32 | 31 | 27 | 27 | | 61 | 60 | 58 | 57 | |
| C.10 | A.10 | 0.58 | 20.5 | 19 | 14 | 12.5 | 6.5 | 33 | 31 | 27 | 26 | 20 | 58 | 58 | 54 | 52 | 50 |
| C.11 | A.11 | 0.55 | 20.5 | 18.5 | 6 | | | 35 | 31 | 20 | | | 59 | 56 | 49 | | |
| C.12 | A.12 | 0.58 | 20 | 18 | 17 | 6 | | 30 | 28 | 28 | 20 | | 60 | 57 | 55 | 50 | |
| C.13 | A.13 | 0.58 | 20.5 | 21 | 16.5 | 13 | | 35 | 35 | 29 | 25 | | 61 | 59 | 57 | 54 | |
| C.14 | A.14 | 0.59 | 18.5 | 18.5 | 17 | 16 | | 28 | 28 | 25 | 24 | | 58 | 57 | 56 | 53 | |
| C.15 | A.15 | 0.57 | 20.5 | 18 | 17 | 15.5 | 7.5 | 41 | 37 | 30 | 27 | 20 | 61 | 60 | 53 | 51 | 49 |
| C.16 | A.15 | 0.59 | 20.5 | 19.5 | 17.5 | 15 | 14.5 | 41 | 38 | 34 | 26 | 26 | 64 | 61 | 55 | 54 | 50 |
| C.17 | A.16 | 0.59 | 20.5 | 20.5 | 18 | 19 | 17 | 39 | 36 | 32 | 30 | 28 | 64 | 62 | 57 | 55 | 52 |
| C.18 | A.16 | 0.62 | 21 | 21 | 19 | 18 | 16.5 | 38 | 38 | 35 | 33 | 31 | 62 | 62 | 59 | 58 | 55 |
| C.19 | A.17 | 0.59 | 19.5 | 19.5 | 18 | 16 | 14 | 33 | 33 | 29 | 25 | 27 | 58 | 57 | 54 | 52 | 50 |
| C.20 | A.18 | 0.59 | 21.5 | 20.5 | 20.5 | 18.5 | 15 | 44 | 39 | 33 | 32 | 26 | 64 | 63 | 58 | 55 | 51 |
| C.21 | A.19 | 0.59 | 19.5 | 20 | 15.5 | 14 | 7 | 37 | 36 | 27 | 24 | 21 | 57 | 57 | 52 | 50 | 47 |
| C.22 | A.20 | 0.56 | 20 | 18 | 15.5 | 13.5 | 12 | 35 | 30 | 27 | 26 | 25 | 59 | 57 | 52 | 50 | 49 |
| C.23 | Gl. 51 | 0.55 | 20 | 20 | 18.5 | 16.5 | 16.5 | 39 | 37 | 32 | 28 | 28 | 59 | 58 | 55 | 53 | 49 |
| C.24 | Gl. 27 | 0.62 | 19.5 | 20.5 | 21 | 19.5 | 20.0 | 30 | 34 | 33 | 32 | 32 | 57 | 59 | 58 | 57 | 55 |

It can clearly be seen from Table 2 that all fluidizers according to the invention which were tested have a strong fluidizing action. It is in all cases greater than the action of Glenium® 27. As can be seen from Examples B.1, B.13 and B.17, the choice of a suitable monomer composition even makes it possible to achieve a consistency retention comparable to Glenium® 27 at a lower W/C value.

It can be seen from Examples B.4, B.5, B.6, B.8, B.9, B.11 and B.20 that the water reduction capability of Glenium® 51 can also be surpassed by use of polymers according to the invention.

It is also noteworthy that even at very high spreads of >26 cm (not shown in Table 2), no segregation ("bleeding") occurs, as would be the case for conventional fluidizers without addition of specific stabilizers.

C. Concrete Tests for Determining the Water Reduction Capability and Retention of the Flowability Over a Period of 90 Minutes The tests were carried out in accordance with DIN EN 206-1, DIN EN 12350-2 and DIN EN 12350-5.

Cement: CEM I 42.5 R v.02.03 Karlstadt (285 kg), amount of fluidizer added: 0.02% based on solids; temperature: 20° C. The results are summarized in Table 3.

In this test series, the water/cement ratio was selected so that a uniform slump value of about 20 cm was achieved for all samples after completion of mixing. Here too, Glenium® 51 and Glenium® 27 served as reference substances.

As in the mortar, the polymers according to the invention display a significant fluidizing action in concrete, too. If only the slump value is considered, it is conspicuous that this usually drops to a greater extent over a period of 90 minutes than is the case for the reference substances Glenium® 51 and 27.

The spread is obtained by shaking the spread table, as described in the abovementioned DIN methods, by lifting and bumping it down 10 times. The shear forces generated by the "knocking" cause further spreading of the concrete. The diameter of the concrete cake after "knocking" is referred to as the spread. If slump and spread are now compared for the reference substances Glenium® 51 and 27 on the one hand and the polymers according to the invention on the other hand, it is conspicuous that the latter have, immediately after mixing (0 min), a greater spread at a comparable slump (Examples C.2, C.3, C.5, C.6, C.7, C.8, C.9, C.12, C.13, C.15, C.16, C.17, C.18, C.20). The differences are even more drastic when the slump values are compared with the corresponding spread values after 60 and 90 minutes. After 90 minutes, Glenium® 51 displays a slump of 16.5 cm and a spread of 49 cm. If Examples C.1, C.6, C.8, C.10, C.11, C.12, C.15 and C.22 are regarded for comparison, it becomes clear that a spread of over 49 cm can be achieved even at very low slump values of less than 10 cm—the concrete is thus so stiff that the cone barely collapses under its own weight. On addition of conventional fluidizers, a concrete cone having such a low slump would disintegrate to produce an irregular noncohesive heap on the spread table after knocking. A spread value can then no longer be reported under these circumstances. This flow under the action of shear forces is referred to as plastic viscosity or shear thinning.

The polymers according to the invention thus result in a significantly stronger shear-thinning behavior of the concrete than conventional fluidizers. This behavior improves, for example, the pumpability of the concretes. The shear thinning results not only in a decrease in energy consumption but also results in suppression of settling of aggregates, which can lead to blocking of the pump. In addition, such a low plastic viscosity results in a decrease in the force which is necessary to pull the pump pipe through the concrete. In addition, the concrete is less sticky, which has a very positive effect on the processability, especially in the case of cement-rich concretes. As mentioned above, the term "rheosmooth" has been introduced to describe this particular process property. It is of particularly great importance when particularly cement-rich concretes are employed, as is the case, for example, in Japan. It has hitherto been very difficult to produce this effect by use of conventional fluidizers.

Apart from shear-thinning properties, the polymers of the invention are also able, at an appropriate monomer composition, to reduce the water requirement of the concrete drastically. As Examples C.8 and C.11 show, the water reduction capability of Glenium® 51 can be matched and even slightly exceeded. Although the processability of the concretes produced using the polymers of the invention tends to drop somewhat more over a period of 90 minutes than is the case for Glenium® 27, the spread of Glenium® 27 is in many cases still achieved after 90 minutes despite a lower W/C value, as can be seen from Examples C.3, C5 and C.18.

The invention claimed is:

1. A suspension comprising an aqueous suspension of solids and a CCT dispersant comprising random comb polymers obtained by free-radical copolymerization according to catalytic chain transfer (CCT) method of a vinylic poly(alkylene oxide) compound (A) of the general formula (I)

(I)

where
$R^1$=hydrogen, a $C_1$-$C_{20}$-alkyl radical, a cycloaliphatic $C_5$-$C_{12}$-cycloalkyl radical, a substituted or unsubstituted $C_6$-$C_{14}$-aryl radical,
m=2 to 4,
n=1 to 250, $Y$=O or $NR^2$,
$R^2$=hydrogen, a $C_{1-12}$-alkyl radical, a $C_6$-$C_{14}$-aryl radical, —$C_mH_{2m}$—(O—$C_mH_{2m}$)$_{n-1}$O$R^1$,
m'=1 to 4 and
n'=0 to 2,
with an ethylenically unsaturated monomer compound (B) of the general formula (II), (II)

where
$R^3$=H, $CH_3$, COOH or a salt thereof, COO$R^7$ or CON$R^7R^7$,
$R^4$=H, a substituted or unsubstituted $C_6$-$C_{14}$-aryl radical,
$R^5$=H, $CH_3$, COOH or a salt thereof, COO$R^7$, CON$R^7R^7$, a substituted or unsubstituted aryl radical or O$R^8$, PO$_3$H$_2$, SO$_3$H, CONH—$R^9$,
$R^6$=H, $CH_3$ or $CH_3$COO$R^7$,
$R^7$=H, $C_1$-$C_{12}$-alkyl, $C_1$-$C_{12}$-hydroxyalkyl, $C_1$-$C_{12}$-alkylphosphate or -phosphonate or a salt thereof, $C_1$-$C_{12}$-alkylsulfate or -sulfonate or a salt thereof, $C_mH_{2m}$—(O—$C_mH_{2m}$)$_{n-1}$O$R^1$,
$R^8$=acetyl and
$R^9$=$C_1$-$C_{12}$-alkylphosphate or -phosphonate or a salt thereof, $C_1$-$C_{12}$-alkylsulfate or -sulfonate or a salt thereof,
$R^3$ and $R^5$ together optionally form —O—CO—O—, the CCT dispersant is in an amount effective for providing the suspension with better water reduction capacity than with a non-CCT dispersant used in the same amount and the CCT dispersant is a comb polymer having the same monomers as the non-CCT dispersant which is not obtained by a CCT method.

2. The suspension as claimed in claim 1, wherein the aryl radicals $R^1$ are substituted by hydroxyl, carboxyl or/and sulfonic acid groups.

3. The suspension as claimed in claim 1, wherein in the formula (I), m=2 or 3 and n=5 to 250.

4. The suspension as claimed in claim 1, wherein in the formula (I), m'=1 and n'=0 or 1.

5. The suspension as claimed in claim 1, wherein in the formula (II), $R^3$ and $R^4$=H, $R^6$=H, $CH_3$ and $R^5$=COO$R^7$, PO$_3$H$_2$, CONH—$R^9$ or SO$_3$H.

6. The suspension as claimed in claim 1, wherein in the formula (II), $R^3$ and $R^4$=H, $R^6$=$CH_3$, $R^5$=COOH or a salt thereof or COO$R^7$ and $R^7$=$C_1$-$C_6$-hydroxyalkyl.

7. The suspension as claimed in claim 1, wherein $R^5$ is a carboxylic acid salt selected from among alkali metal, alkaline earth metal and ammonium salts.

8. The suspension as claimed in claim 1, wherein the molar ratios of the vinylic poly(alkylene oxide) compound (A) to the ethylenically unsaturated monomer compound (B) have been set to from 1:0.01 to 1:100.

9. The suspension as claimed in claim 1, wherein the comb polymers are used in an amount of from 0.01 to 5% by weight, based on the suspension of solids.

10. The suspension as claimed in claim 1, wherein the suspension of solids comprises hydraulic binders based on cement, lime, plaster of Paris and anhydrite.

11. The suspension as claimed in claim 1, wherein the suspension of solids comprises inorganic particles selected from the group consisting of ground rock, ground silicate, chalk, clays, porcelain slips, talc, pigments and carbon black.

12. The suspension as claimed in claim 8, wherein the molar ratios of the vinylic poly(alkylene oxide) compound (A) to the ethylenically unsaturated monomer compound (B) have been set to from 1:0.1 to 1:50.

13. The suspension as claimed in claim 1, wherein the CCT dispersant is in an amount effective for providing the suspension with better water flowability as measured by slump flow than with a non-CCT dispersant used in the same amount and the CCT dispersant is a comb polymer having the same monomers as the non-CCT dispersant not obtained by a CCT method.

14. A method for making an aqueous suspension comprising solids and a CCT dispersant, the method comprising:
mixing particulate solids, water and a CCT dispersant, the CCT dispersant comprising random comb polymers obtained by free-radical copolymerization according to catalytic chain transfer (CCT) method of a vinylic poly (alkylene oxide) compound (A) of the general formula (I)

(I)

where
R¹=hydrogen, a $C_1$-$C_{20}$-alkyl radical, a cycloaliphatic $C_5$-$C_{12}$-cycloalkyl radical, a substituted or unsubstituted $C_6$-$C_{14}$-aryl radical,
m=2 to 4,
n=1 to 250, Y=O or NR²,
R²=hydrogen, a $C_{1-12}$-alkyl radical, a $C_6$-$C_{14}$-aryl radical, —$C_mH_{2m}$—(O—$C_mH_{2m}$)$_{n-1}$OR¹,
m'=1 to 4 and
n'=0 to 2,
with an ethylenically unsaturated monomer compound (B) of the general formula (II), (II)

where
R³=H, $CH_3$, COOH or a salt thereof, COOR⁷ or CONR⁷R⁷,
R⁴=H, a substituted or unsubstituted $C_6$-$C_{14}$-aryl radical,
R⁵=H, $CH_3$, COOH or a salt thereof, COOR⁷, CONR⁷R⁷, a substituted or unsubstituted aryl radical or OR⁸, $PO_3H_2$, $SO_3H$, CONH—R⁹,
R⁶=H, $CH_3$ or $CH_3COOR^7$,
R⁷=H, $C_1$-$C_{12}$-alkyl, $C_1$-$C_{12}$-hydroxyalkyl, $C_1$-$C_{12}$-alkylphosphate or -phosphonate or a salt thereof, $C_1$-$C_{12}$-alkylsulfate or -sulfonate or a salt thereof, $C_mH_{2m}$—(O—$C_mH_{2m}$)$_{n-1}$OR¹,
R⁸=acetyl and
R⁹=$C_1$-$C_{12}$-alkylphosphate or -phosphonate or a salt thereof, $C_1$-$C_{12}$-alkylsulfate or -sulfonate or a salt thereof,
R³ and R⁵ together optionally form —O—CO—O—.

15. The method as claimed in claim 14, wherein the aryl radicals R¹ are substituted by hydroxyl, carboxyl or/and sulfonic acid groups.

16. The method as claimed in claim 14, wherein in the formula (I), m=2 or 3 and n=5 to 250.

17. The method as claimed in claim 14, wherein in the formula (I), m'=1 and n'=0 or 1.

18. The method as claimed in claim 14, wherein in the formula (II), R³ and R⁴=H, R⁶=H, $CH_3$ and R⁵=COOR⁷, $PO_3H_2$ or CONH—R⁹—$SO_3H$.

19. The method as claimed in claim 14, wherein in the formula (II), R³ and R⁴=H, R⁶=$CH_3$, R⁵=COOH or a salt thereof or COOR⁷ and R⁷=$C_1$-$C_6$-hydroxyalkyl.

20. The method as claimed in claim 14, wherein R⁵ is a carboxylic acid salt selected from among alkali metal, alkaline earth metal and ammonium salts.

21. The method as claimed in claim 14, wherein the molar ratios of the vinylic poly(alkylene oxide) compound (A) to the ethylenically unsaturated monomer compound (B) have been set to from 1:0.01 to 1:100.

22. The method as claimed in claim 14, wherein the comb polymers are used in an amount of from 0.01 to 5% by weight, based on the suspension of solids.

23. The method as claimed in claim 14, wherein the suspension of solids comprises hydraulic binders based on cement, lime, plaster of Paris and anhydrite.

24. The method as claimed in claim 14, wherein the suspension of solids comprises inorganic particles selected from the group consisting of ground rock, ground silicate, chalk, clays, porcelain slips, talc, pigments and carbon black.

25. The method as claimed in claim 21, wherein the molar ratios of the vinylic poly(alkylene oxide) compound (A) to the ethylenically unsaturated monomer compound (B) have been set to from 1:0.1 to 1:50.

26. The method as claimed in claim 14, wherein the CCT dispersant is in an amount effective for providing the suspension with better water reduction capacity than with a non-CCT dispersant used in the same amount and the CCT dispersant is a comb polymer having the same monomers as the non-CCT dispersant not obtained by a CCT method.

27. The method as claimed in claim 26, wherein the CCT dispersant is in an amount effective for providing the suspension with better water flowability as measured by slump flow than with a non-CCT dispersant used in the same amount and the CCT dispersant is a comb polymer having the same monomers as the non-CCT dispersant not obtained by a CCT method.

* * * * *

UNITED STATES PATENT AND TRADEMARK OFFICE
CERTIFICATE OF CORRECTION

| | | |
|---|---|---|
| PATENT NO. | : 8,299,192 B2 | Page 1 of 1 |
| APPLICATION NO. | : 10/567260 | |
| DATED | : October 30, 2012 | |
| INVENTOR(S) | : Kraus et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1234 days.

Signed and Sealed this
Twenty-sixth Day of August, 2014

Michelle K. Lee
*Deputy Director of the United States Patent and Trademark Office*